United States Patent
Hashida et al.

(10) Patent No.: US 6,984,002 B2
(45) Date of Patent: Jan. 10, 2006

(54) BRAKE HYDRAULIC PRESSURE GENERATOR

(75) Inventors: Koichi Hashida, Asahi-machi (JP); Haruo Arakawa, Asahi-machi (JP)

(73) Assignee: Advics Co., Ltd., Kariya (JP)

( * ) Notice: Subject to any disclaimer, the term of this patent is extended or adjusted under 35 U.S.C. 154(b) by 176 days.

(21) Appl. No.: 10/687,604

(22) Filed: Oct. 20, 2003

(65) Prior Publication Data

US 2004/0080207 A1 Apr. 29, 2004

(30) Foreign Application Priority Data

Oct. 21, 2002 (JP) ........................................ 2002-305659

(51) Int. Cl.
*B60T 13/12* (2006.01)
*B60T 13/18* (2006.01)

(52) U.S. Cl. ...................... 303/114.1; 60/582; 188/358; 303/50

(58) Field of Classification Search .............. 303/114.1, 303/113.4, 50, DIG. 1, 122.11, 122.12, 122.13, 303/10–12, DIG. 2; 188/358, 359; 91/376 R, 91/369.1, 446; 60/547.1, 582, 555, 552, 562
See application file for complete search history.

(56) References Cited

U.S. PATENT DOCUMENTS

| | | | |
|---|---|---|---|
| 4,489,555 A | | 12/1984 | Leiber |
| 5,526,731 A | * | 6/1996 | Hashida ..................... 91/376 R |
| 6,652,040 B2 | | 11/2003 | Oka et al. |
| 2003/0029166 A1 | * | 2/2003 | Hashida ........................ 60/562 |
| 2004/0080207 A1 | * | 4/2004 | Hashida et al. ............... 303/11 |
| 2004/0088975 A1 | * | 5/2004 | Tsubouchi et al. ............ 60/552 |
| 2004/0089508 A1 | * | 5/2004 | Tsubouchi et al. .......... 188/357 |

FOREIGN PATENT DOCUMENTS

| JP | 59-109453 A | 6/1984 |
|---|---|---|
| JP | 2002-173016 A | 6/2002 |

* cited by examiner

*Primary Examiner*—Douglas C. Butler
(74) *Attorney, Agent, or Firm*—Burns, Doane, Swecker & Mathis, L.L.P.

(57) ABSTRACT

A brake hydraulic pressure generator is proposed in which the brake stroke fluctuate less when the amount of brake fluid consumed in the wheel brakes fluctuates. Even when the brake pedal force is increased after the brake assisting force has reached its maximum, the reaction force to the pedal force as well as the master cylinder pressure increases corresponding to the increased pedal force. The brake hydraulic pressure generator has a control valve including a spool and a cylinder and adapted to control the hydraulic pressure in a dynamic pressure chamber to a value corresponding to the stroke of an input shaft. It further includes a pressure sensor, a solenoid valve and a fluid chamber. When the pressure sensor detects that the difference between the pressure in the dynamic pressure chamber and the pressure of the high pressure source is below a predetermined value, the solenoid valve is adapted to close, thereby checking relative movement between the master cylinder piston and the input shaft toward each other.

4 Claims, 5 Drawing Sheets

US 6,984,002 B2

BRAKE HYDRAULIC PRESSURE GENERATOR

BACKGROUND OF THE INVENTION

This invention relates to a brake hydraulic pressure generator which has a control valve and generates hydraulic pressure according to manual braking effort applied through a brake pedal, particularly to a brake hydraulic pressure generator in which the brake operating stroke is substantially not influenced by the amount of brake fluid consumed in the wheel brake cylinders.

In prior art brake hydraulic pressure generators, the manual brake operating force is amplified by a booster and applied to a master cylinder. In this type of devices, the brake pedal stroke corresponds directly to the amount of brake fluid discharged from the master cylinder. Thus, the brake pedal stroke is inevitably influenced when an additional hydraulic device such as an antilock brake unit is activated.

The JP patent publications 2002-173016 and 59-109453 disclose brake hydraulic pressure generators that aim to solve this problem.

Publication 2002-173016 discloses various brake hydraulic pressure generators which can keep the brake pedal stroke from varying with change in the amount of brake fluid consumed in the wheel brakes. One of them uses a negative pressure as power source.

FIG. 5 shows a device which is the same as the device shown in FIG. 6 of the publication 2002-173016.

The stroke of an input shaft 4 of the device shown in FIG. 5 is substantially equal to the stroke of a piston 5b which is axially slidable relative to a power plate 15a. The pressure in a dynamic pressure chamber 15b pushes the piston 5b leftwardly in the figure against the force of a spring 7. The piston 5b stops at a point where the pressure in the dynamic pressure chamber 15b balances with the force of the spring 7. Since the stroke of the input shaft 4 is substantially equal to that of the piston 5b, the stroke of the input shaft 4 is determined by the pressure in the dynamic pressure chamber 15b.

On the other hand, the pressure in the master cylinder 16 acts on the end 18 of the input shaft 4 as a reaction force against the pedal operating force. The pressure in the master cylinder 16 corresponds to the pressure in the dynamic pressure chamber 15b. Thus, the relation between the pedal stroke and the pedal reaction force can be set substantially independently of the amount of brake fluid consumed in the wheel brakes.

In these devices, the force of the spring 7 is determined such that the stroke of the master cylinder 16 is greater than that of the input shaft 4.

In the arrangement of FIG. 5, negative pressure is produced in a chamber 15c. The master cylinder pressure corresponds to the differential pressure between the chambers 15c and 15b until the differential pressure reaches its maximum. The differential pressure reaches its maximum when the pressure in the dynamic pressure chamber 15b is equal to the atmospheric pressure because the pressure in the dynamic pressure chamber never exceeds the atmospheric pressure. If the brake pedal is depressed with an increased force after the pressure differential between the chambers 15b and 15c reaches its maximum, the input shaft 4 is further pushed into the master cylinder 16 (moved leftwardly in the figure), while the master cylinder piston 16a is moved rightwardly in the figure against the differential pressure until the input shaft 4 abuts the master cylinder piston 16a. The master cylinder pressure and the reaction force applied to the input shaft 4 remain unchanged all the while. This means that the brake pressure cannot be increased any further until the input shaft 4 abuts the master cylinder piston 16a. This makes the driver very uncomfortable.

Particularly if the driver depresses the brake pedal with a force greater than the maximum pressure differential between the chambers 15b and 15c, the driver may suspect possible leak of brake fluid through pipes because the reaction force never increases even though the brake pedal is moving.

In the publication 59-109453, means are provided for checking the stroke of the input shaft before the pressure differential between the negative pressure chamber (e.g. chamber 15c) and the dynamic pressure chamber (e.g. chamber 15b) reaches its maximum. But in this arrangement, it is absolutely impossible to increase the brake pressure above the maximum differential pressure. This arrangement is not practically feasible because the negative pressure produced in the negative pressure chamber fluctuates, so that the maximum differential pressure, which directly corresponds to the negative pressure, also fluctuates. This means that the maximum braking force also fluctuates. This arrangement is not desirable to a brake hydraulic pressure generator that does not use negative pressure, either, because the means for checking the stroke of the input shaft makes it impossible to increase the brake pressure above the inherent maximum brake pressure even if much higher braking force is needed due to fading of friction materials.

An object of this invention is to provide a brake hydraulic pressure generator which does not allow the brake pedal to be pressed in without any increase in the reaction force against the pedal operating force.

SUMMARY OF THE INVENTION

According to this invention, there is provided a brake hydraulic pressure generator comprising a high pressure source, a low pressure source, a brake operating member, an input shaft moved by a brake operating force applied to the brake operating member, a dynamic pressure chamber, a control valve, and a master cylinder piston, the control valve having a first valve element receiving the brake operating force applied to the brake operating member and a second valve element, the first and second valve elements moving relative to each other under the brake operating force applied to the brake operating member to selectively connect the dynamic pressure chamber to the high pressure source or the low pressure source, whereby controlling the pressure in the dynamic pressure chamber to a level corresponding to the stroke of the input shaft, the master cylinder piston being biased by the pressure in the dynamic pressure chamber while the high pressure source and the low pressure source are normal, and biased by the input shaft if the high pressure source or the low pressure source fails, the brake hydraulic pressure generator further comprising a pressure detector for detecting that the difference between the pressure in the dynamic pressure chamber and the pressure of the high pressure source is below a predetermined value, and a relative movement restrictor for checking the relative movement between the master cylinder piston and the input shaft toward each other when the pressure detector detects that the difference between the pressure in the dynamic pressure chamber and the pressure of the high pressure source is below the predetermined value.

The relative movement restrictor comprises a fluid chamber defined by the master cylinder piston and the input shaft or by members linked to the master cylinder piston and the input shaft, and an on-off element for normally keeping the fluid chamber in communication with the exterior thereof, and sealing the fluid chamber from the exterior when the pressure detector detects that the difference between the pressure in the dynamic pressure chamber and the pressure of the high pressure source is below the predetermined value.

The pressure detector is adapted to detect that the first valve element has moved relative to the second valve element by a predetermined distance or over toward a position where the dynamic pressure chamber communicates with the high pressure source.

When the pressure in the dynamic pressure chamber rises close to its maximum, that is, when the difference between the pressure in the dynamic pressure chamber and the pressure of the high pressure source decreases close to zero or below a predetermined value, the relative movement restrictor locks the input shaft and the master cylinder piston together. Thus, even when the driver increases the pedal force after the pressure in the dynamic pressure chamber has exceeded its maximum, the master cylinder pressure and thus the reaction force increase corresponding to the pedal force.

The brake pressure can thus be further increased even after the pressure in the dynamic pressure chamber has increased to its maximum.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
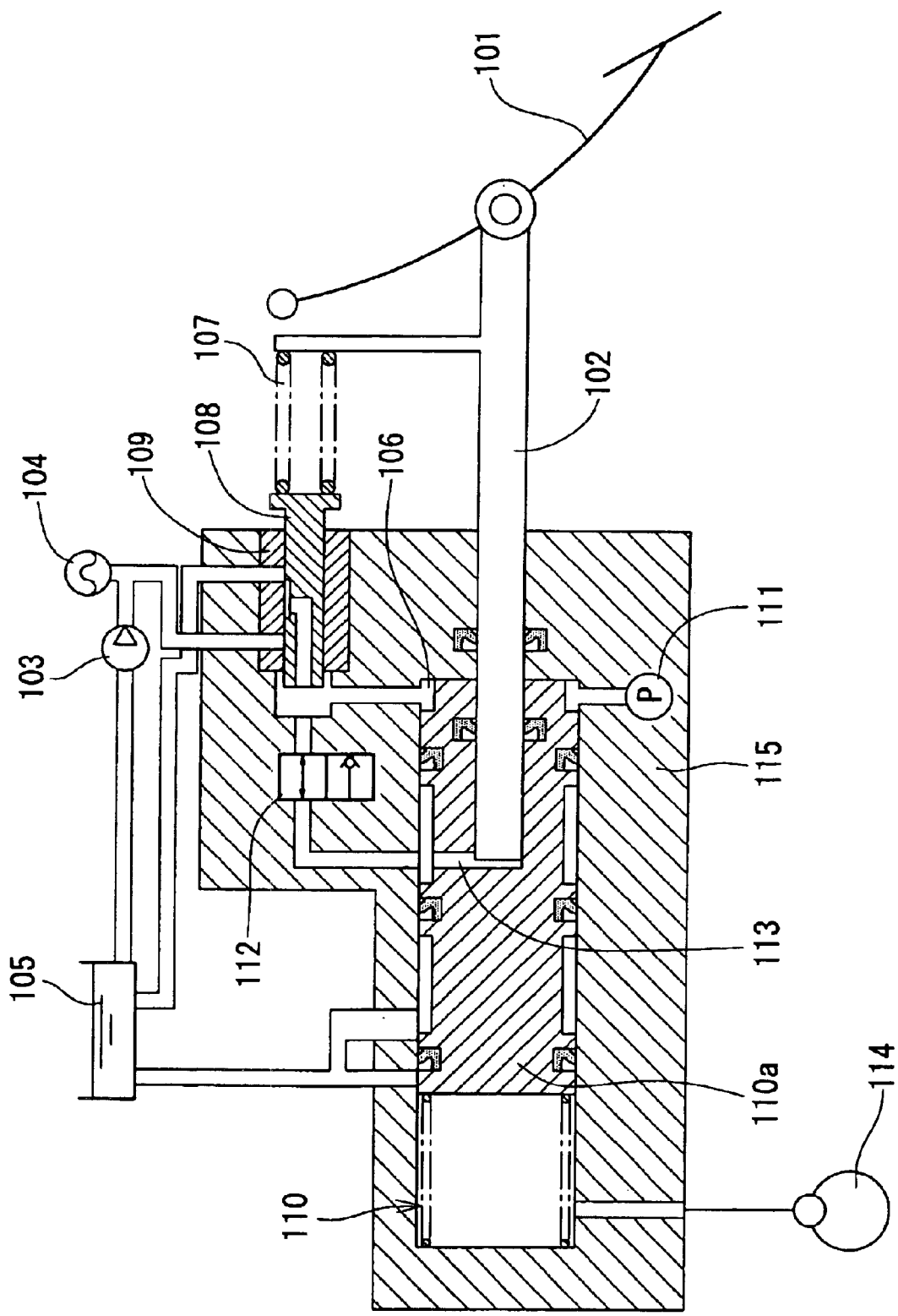
FIG. 1 a schematic view of the brake hydraulic pressure generator of a first embodiment of this invention.
Figure 2:
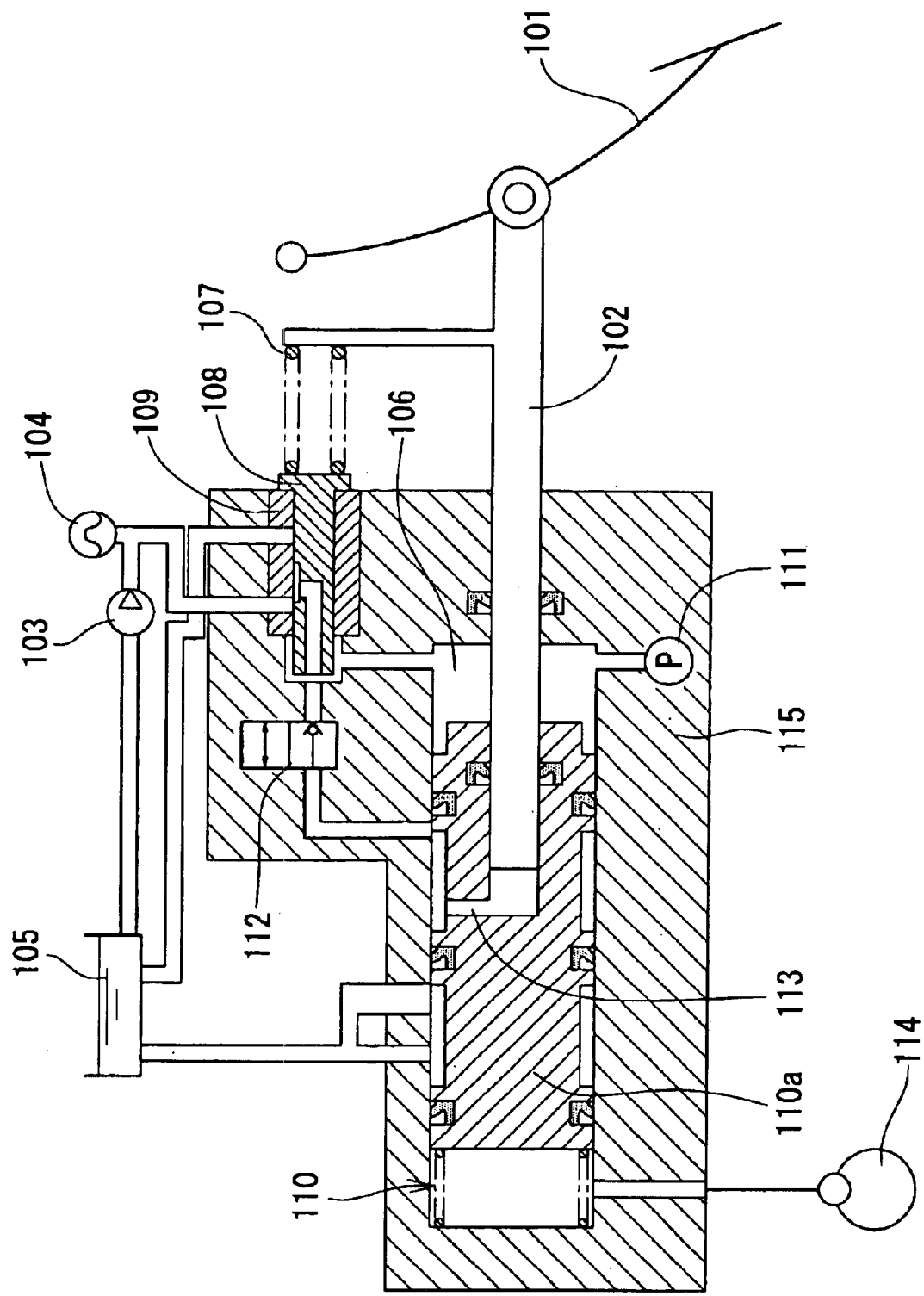
FIG. 2 is a view showing how it operates.

Now referring to the drawings, FIGS. 1 and 2 show the brake hydraulic pressure generator of the first embodiment. It includes a brake pedal 101, an input shaft 102, a high pressure source comprising a hydraulic pump 103 and a pressure accumulator 104, a reservoir 105 which is a low pressure source, and a housing 115. A spool 108 is slidably inserted in a cylinder 109 fixedly mounted in the housing 115. The spool 108 is a first valve element and the cylinder 109 has a second valve element. A spring 107 is disposed between the spool 108 and a flange of the input shaft 102. A master cylinder 110 is defined in the housing 115 at one end of a master cylinder piston 110a. A dynamic pressure chamber 106 is defined in the housing 115 at the other end of the master cylinder piston 110a.

The brake hydraulic pressure generator further includes a pressure sensor 111 and a normally closed solenoid valve 112. A fluid chamber 113 is defined in the master cylinder piston 110a to oppose the free end of the input shaft 102. For simplicity, FIGS. 1 and 2 show only one wheel brake 114. The pump 103 is controlled by a controller (not shown) to keep hydraulic fluid at a predetermined constant hydraulic pressure in the accumulator 104. As the spool 108 slides in the cylinder 109, the dynamic pressure chamber 106 selectively communicates with the reservoir 105 (low pressure source) and the accumulator 104 (high pressure source), so that the pressure in the dynamic pressure chamber 106 is controlled to a value depending on the stroke of the input shaft 102.

Specifically, in FIG. 1, the brake pedal 101 is not depressed with the dynamic pressure chamber 106 in communication with the reservoir 105. When the brake pedal 101 is depressed in this state, the input shaft 102 moves leftwardly and the spool 108 is biased leftwardly in the figure by the spring 107 and moves leftwardly until the passage between the dynamic pressure chamber 106 and the reservoir 105 is closed and then the pressure accumulator 104 is brought into communication with the dynamic pressure chamber 106. High pressure thus introduced into the dynamic pressure chamber 106 from the accumulator 104 then moves the spool 108 rightwardly in the figure. When the spool 108 moves to a position where the dynamic pressure chamber 106 communicates neither with the accumulator 104 nor the reservoir 105, the pressure in the dynamic pressure chamber 106 balances with the biasing force of the spring 107. The spool 108 thus stops at this position.

Since the fluid chamber 113 is in communication with the dynamic pressure chamber 106 through the solenoid valve 112, the two chambers 106 and 113 are at the same pressure. Thus the reaction force applied to the input shaft 102 is the product of the sectional area of the fluid chamber 113 and the pressure in the dynamic pressure chamber 106. Due to this fact, the relationship between the stroke of the input shaft 102 and the reaction force is dependent solely on how the spring 107 and the spool 108 are designed, and is never dependent on the amount of brake fluid consumed in the wheel brakes 114, provided the system is designed such that the stroke of the master cylinder piston 110a, which depends on the amount of brake fluid consumed in the wheel brakes 114, is larger than that of the input shaft 102.

FIG. 2 shows a state in which the driver has depressed the brake pedal 101 hard until the pressure in the dynamic pressure chamber 106 has risen to a level nearly equal to the pressure in the high pressure source. In this state, it is assumed that the master cylinder piston 110a has displaced a longer distance than the input shaft 102.

When the pressure sensor 111 detects that the pressure in the dynamic pressure chamber 106 has reached a predetermined level, a controller such as a computer (not shown) closes the solenoid valve 112. Once the valve 112 is closed, brake fluid will not move to the dynamic pressure chamber 106, but is sealed in the chamber 113. Thus in the state of FIG. 2, the input shaft 102 will not move toward the master cylinder piston 110a. Thus, the solenoid valve 112 serves as a relative movement restrictor for checking the relative movement between the master cylinder piston 110a and the input shaft 102 toward each other. Therefore, even if the driver depresses the brake pedal 101 hard after the pressure in the dynamic pressure chamber 106 has become equal to the pressure in the accumulator 104, the brake pedal will not be pushed in without any increase in the reaction force against the brake operating force. Also, higher pressure than the pressure of the high pressure source supplied from the accumulator 104 will be produced in the fluid chamber 113 to bias the master cylinder piston 110a. Simultaneously the pressure in the dynamic pressure chamber will become equal to the pressure of the high pressure source, biassing the master cylinder piston 110a. This means that the maximum brake pressure is limited not by the accumulator pressure but by the manual force the driver can exert on the brake pedal. But after the valve 112 has been closed, the stroke of the input shaft 102 is directly dependent upon the amount of brake fluid consumed in the wheel brakes 114.

In the case of a failure of the high pressure source, the pressure in the pressure chamber 113 disappears, so that the input shaft 102 is pushed into the master cylinder piston 110a until the former abuts the latter. Thus the brake operating force is transmitted directly from the input shaft 102 to the master cylinder piston 110a.

Figure 3:
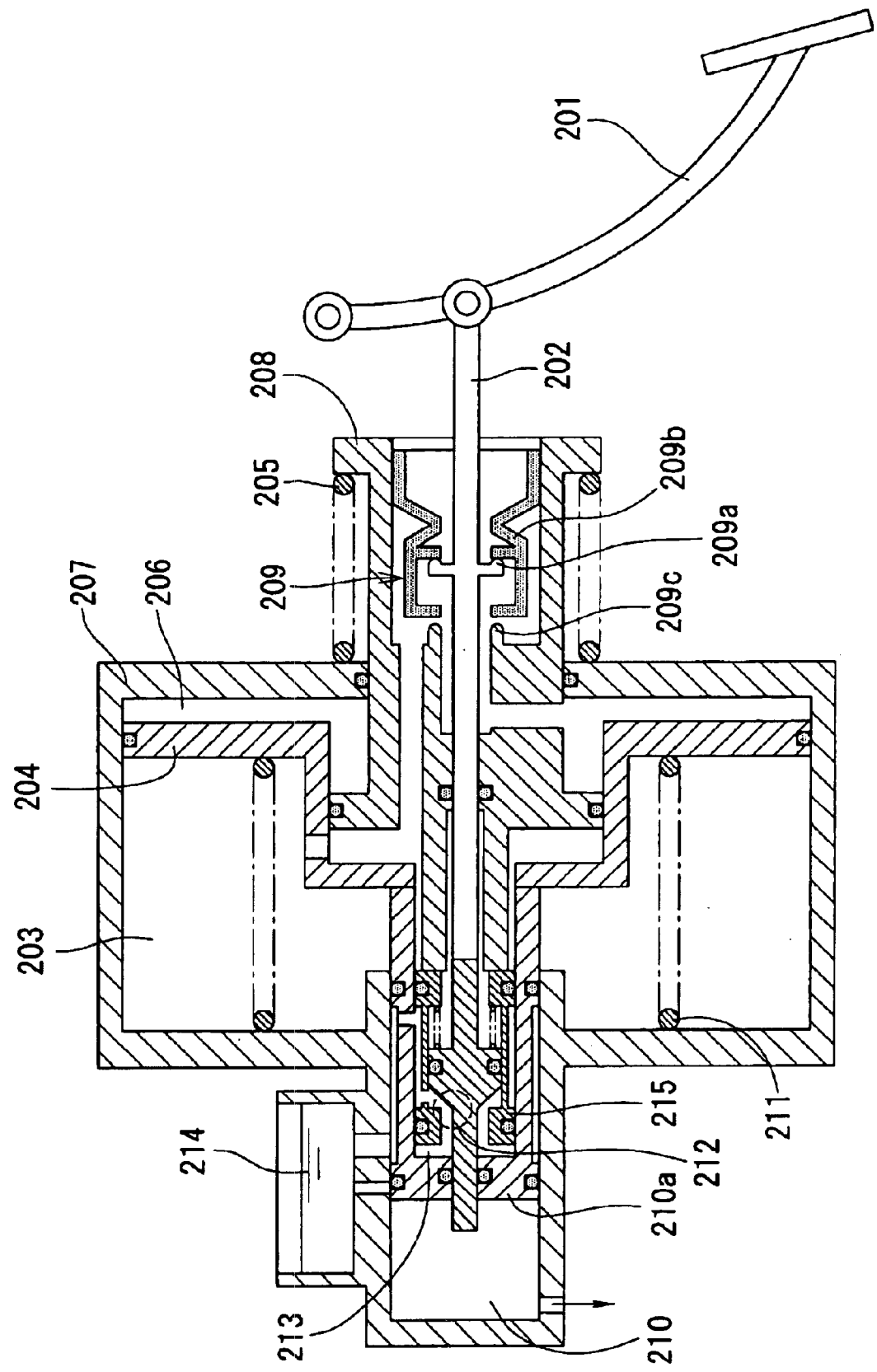
FIG. 3 is a schematic view showing a second embodiment.
Figure 4:
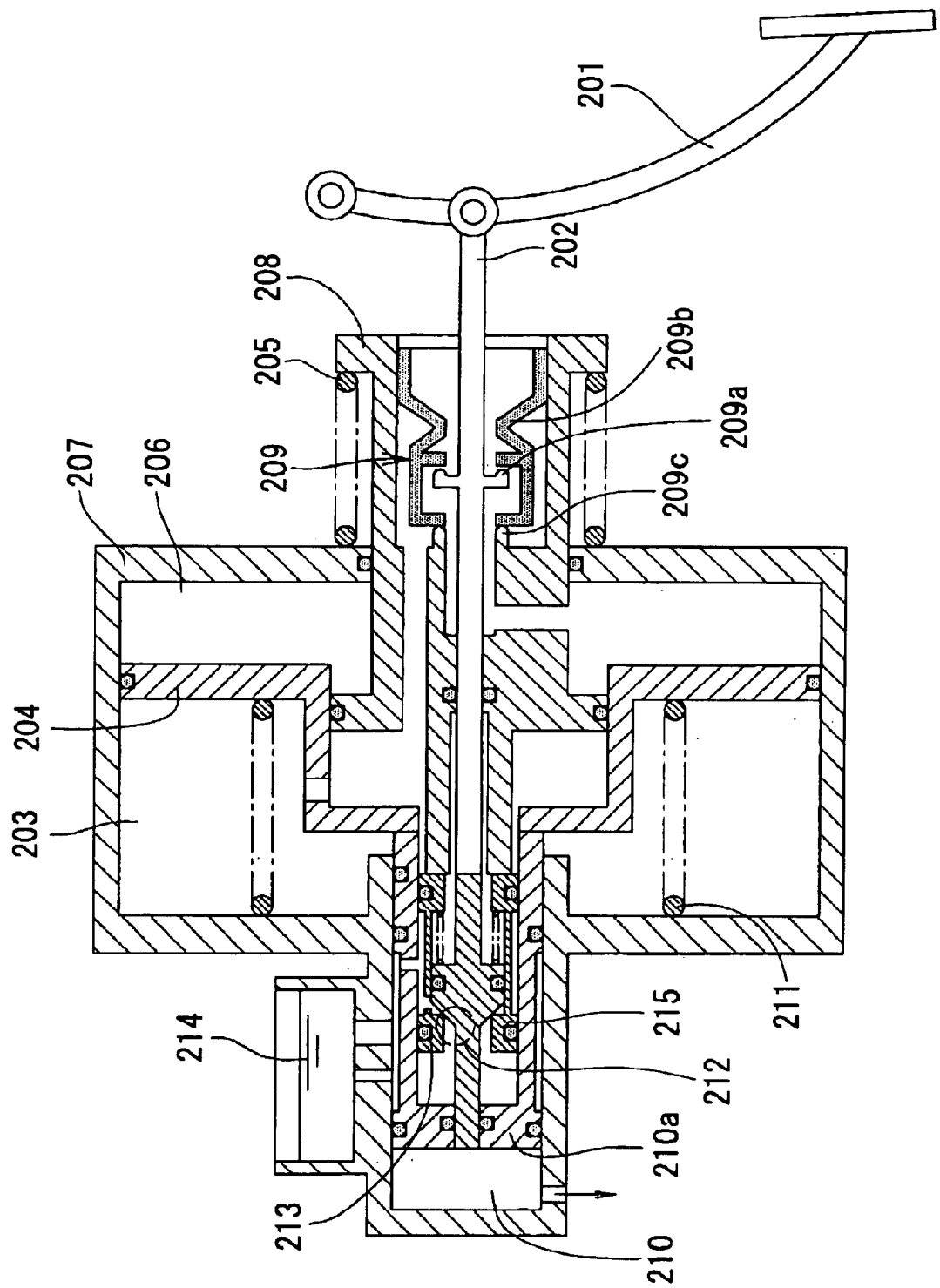
FIG. 4 is a view showing how the device of FIG. 3 operates.
Figure 5:
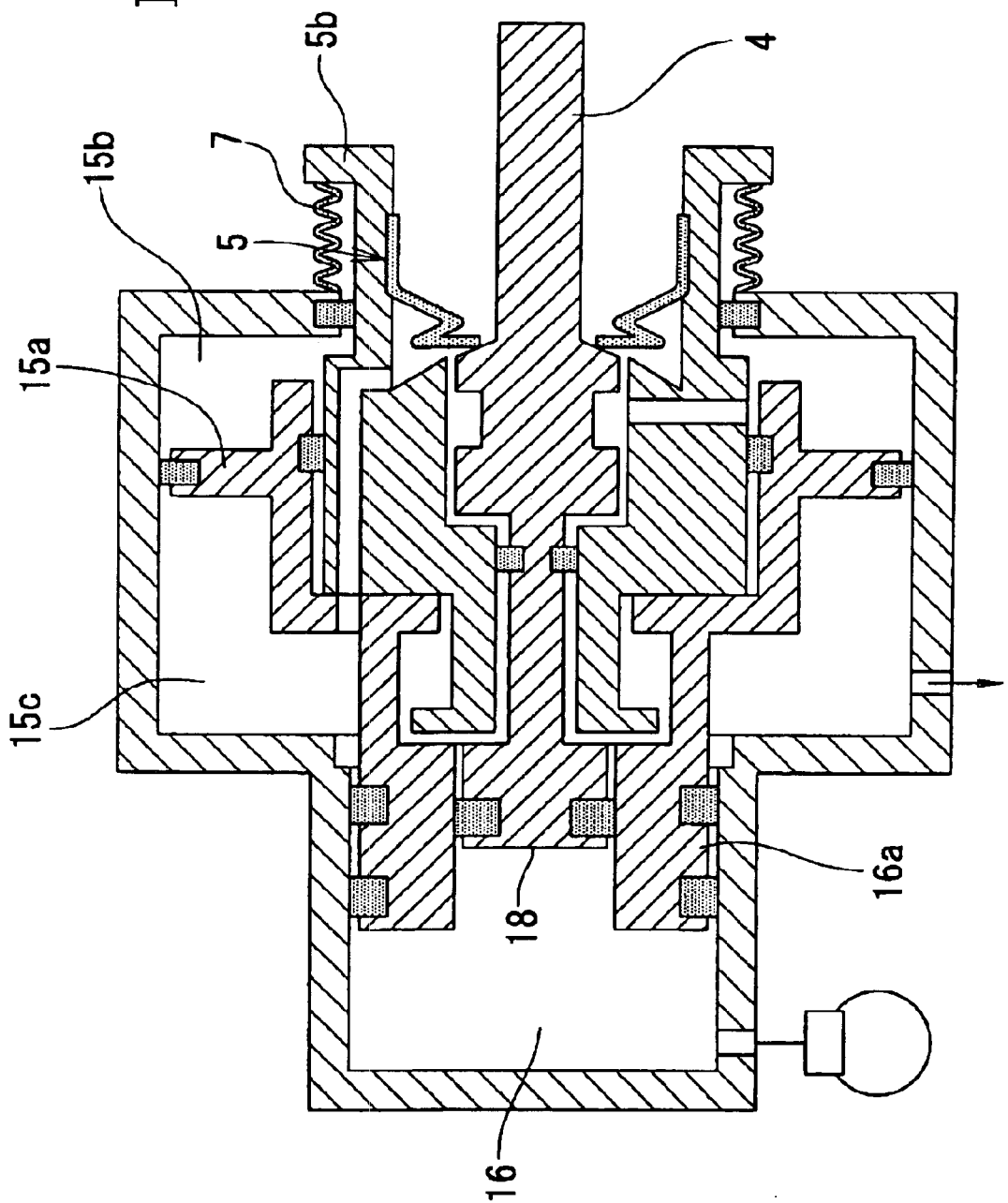
FIG. 5 shows a prior art device.

FIGS. 3 and 4 show the brake hydraulic pressure generator of the second embodiment. It includes a fixed shell 207 in which are defined a low pressure chamber 203 and a dynamic pressure chamber 206 that are partitioned by an axially slidable power plate 204. The low pressure chamber 203 communicates with a low pressure source (not shown) such as an intake manifold. A piston 208 is axially slidable relative to the power plate 204. An input shaft 202 is axially slidably inserted in the piston 208 and carries a brake pedal 201 at one end. A spring 205 is disposed between the fixed shell 207 and a flange of the piston 208 so as to bias the piston 208 rightwardly in the figure. The shell 207 has a master cylinder 210 defined at one end of a master cylinder piston 210a axially slidably mounted in the master cylinder 210. A spring 211 is mounted in the low pressure chamber 203 so as to bias the power plate 204 toward the dynamic pressure chamber 206.

A fluid chamber 213 is defined in the master cylinder piston 210a. 214 is a reservoir. A piston 215 is mounted in the master cylinder piston 210a.

This device further includes a control valve 209 for communicating the dynamic pressure chamber 206 to atmosphere. The control valve 209 comprises a valve seat 209a (first valve element) integrally formed on the input shaft 202, a valve body 209b (second valve element) mounted on the piston 208 so as to be elastically deformable, and a second valve seat 209c integrally formed on the piston 208. The valve seat 209a and the valve body 209b also serve as a pressure sensor. The device of the second embodiment further includes a normally open valve 212 for checking the input shaft 202 from moving leftwardly in the figure relative to the master cylinder piston 210a. This valve 212 cooperates with a fluid chamber 213 to work as a relative movement restrictor for checking the relative movement between the input shaft 202 and the master cylinder piston 210a toward each other.

Firstly, it will be described how the second embodiment operates during ordinary brake operation.

In FIG. 3, the brake pedal 201 is not depressed, and the valve body 209b is elastically compressed by the valve seat 209a. When the brake pedal 201 is depressed in this state and the input shaft 202 begins to move leftwardly in the figure, the valve body 209b will expand axially kept in contact with the valve seat 209a until its free end is seated on the valve seat 209c. When the valve body 209b is seated on the valve seat 209c, communication between the low pressure chamber 203 and the dynamic pressure chamber 206 is cut off. When the input shaft 202 is further moved leftwardly, the valve seat 209a will separate from the valve body 209b, so that the dynamic pressure chamber 206 now opens to the atmosphere, which, in this embodiment, serves as the high pressure source. The pressure in the dynamic pressure chamber 206 thus rises quickly, creating a differential pressure between the chambers 203 and the chamber 206. This differential pressure moves, on one hand, the piston 208 leftwardly in FIG. 3 to a position where the differential pressure balances with the force of the spring 205, and on the other hand, moves the power plate 204 and the master cylinder piston 210a leftwardly.

When the driver stops the input shaft 202 at an intermediate position where the valve body 209b is separate from the valve seat 209 while being seated on the valve seat 209c, the pressure in the dynamic pressure chamber 206 and thus the differential pressure between the chambers 203 and 206 increase while compressing the spring 205 until the valve body 209b is again seated on the valve seat 209a. At the same time, the differential pressure pushes the master cylinder piston 210a a longer distance than the input shaft 202. Thus, while the stroke of the input shaft 202 is shorter than a predetermined value, the differential pressure is proportional to the force of the spring 205, which is determined by the stroke of the input shaft 202. Since the master cylinder pressure and the reaction force applied to the input shaft are determined by the differential pressure between the chambers 203 and 206, the relation between the the stroke of the input shaft 202 and the reaction force applied to the input shaft 202 can be set independently of the amount of brake fluid consumed in the wheel brakes.

In the second embodiment, too, the system design should be such that the displacement of the master cylinder piston 210a dependent on the amount of fluid consumed is larger than the displacement of the input shaft 202.

Referring to FIG. 4, it will be described how the system operates when the driver depresses the brake pedal 201 hard to such an extent that the pressure in the dynamic pressure chamber 206 rises to the atmospheric pressure. Since the pressure in the dynamic pressure chamber 206 never exceeds the atmospheric pressure, the piston 208 stops at a point where the valve body 209b is still separate from the valve seat 209a as shown in FIG. 4. In this embodiment, various parts of the device are arranged such that the moment the brake pedal 201 is further pushed in after the pressure in the dynamic pressure chamber 206 has reached the atmospheric pressure, the valve means 212 is adapted to be closed due to movement of the input shaft 202 relative to the piston 208. Thus the brake fluid in the fluid chamber 213 defined in the master cylinder piston 210a will not flow to the reservoir 214 any more. Since brake fluid is a liquid and a liquid is practically incompressible, the input shaft 202 cannot be pushed toward the master cylinder piston 210a any further. Thus, when the driver applies increased force to the brake pedal 201 after the pressure in the dynamic pressure chamber 206 has reached the atmospheric pressure, the reaction force will increase in response to the force applied to the brake pedal 201 by the driver. Thus, even after the pressure in the dynamic pressure chamber has reached the atmospheric pressure, the driver can further increase the braking force by depressing the pedal with increased force.

When the pedal force is relaxed until the pressure in the dynamic pressure chamber drops below the atmospheric pressure, the pressure in the fluid chamber 213 drops to the atmospheric pressure, causing the valve means 212 to open spontaneously. Thus, the input shaft 202 smoothly retracts following the pedal.

If the low pressure source fails, the manual force applied to the input shaft 202 is transmitted to the master cylinder piston 210a through the piston 215.

Whether or not the valve means 212 is closed can be checked by checking the position of the valve seat 209a and valve body 209b of the control valve 209. Thus no analogue pressure sensor as used in the device of FIG. 1 is necessary.

No solenoid valve or its electric circuit is necessary to open and close the valve means 212 at proper timing because the valve means 212, which operates in response to relative movement of the input shaft 202 relative to the piston 208, is used to change over the relative movement restricting means.

In the present invention, means is provided for preventing relative movement of the master cylinder piston and the input shaft when pressure detecting means detects that the difference in pressure between the dynamic pressure chamber and the high pressure source is below a predetermined value, means for preventing relative movement checks the relative movement between the master cylinder piston and the input shaft toward each other. Thus, even when the pedal force is increased after the pressure in the dynamic pressure has reached its maximum, the reaction force increases corresponding to the pedal force. Also, the master cylinder pressure can be increased above the pressure corresponding to the maximum pressure in the dynamic pressure chamber.

In the arrangement of the second embodiment, no analogue pressure sensor or electromagnetic valve is needed to control the means for preventing relative movement.

That is, by detecting the relative position between the first and second valve elements, it is possible to detect the state of the means for preventing relative movement without the need to use an expensive analogue pressure sensor. This decreases the cost.

Also in the second embodiment, the valve means is opened and closed at proper timing by suitably arranging various parts of the system. Thus, no electromagnetic valve and its electric circuit is necessary to open and close the valve means 212 at proper timing. The valve means 212 is opened and closed at proper timing by suitably arranging various parts of the system.

What is claimed is:

1. A brake hydraulic pressure generator comprising a high pressure source, a low pressure source, a brake operating member, an input shaft moved by a brake operating force applied to said brake operating member, a dynamic pressure chamber, a control valve, and a master cylinder piston, said control valve having a first valve element receiving the brake operating force applied to said brake operating member and a second valve element, said first and second valve elements moving relative to each other under the brake operating force applied to said brake operating member to selectively connect said dynamic pressure chamber to said high pressure source or said low pressure source, whereby controlling the pressure in said dynamic pressure chamber to a level corresponding to the stroke of said input shaft, said master cylinder piston being biased by the pressure in said dynamic pressure chamber while said high pressure source and said low pressure source are normal, and biased by said input shaft if said high pressure source or said low pressure source fails, said brake hydraulic pressure generator further comprising a pressure detector for detecting that the difference between the pressure in said dynamic pressure chamber and the pressure of said high pressure source is below a predetermined value, and a relative movement restrictor for checking the relative movement between said master cylinder piston and said input shaft toward each other when said pressure detector detects that the difference between the pressure in said dynamic pressure chamber and the pressure of said high pressure source is below said predetermined value.

2. A brake hydraulic pressure generator as claimed in claim 1 wherein said relative movement restrictor comprises a fluid chamber defined by said master cylinder piston and said input shaft or by members linked to said master cylinder piston and said input shaft, and an on-off element for normally keeping said fluid chamber in communication with the exterior thereof, and sealing said fluid chamber from the exterior when said pressure detector detects that the difference between the pressure in said dynamic pressure chamber and the pressure of said high pressure source is below said predetermined value.

3. A brake hydraulic pressure generator as claimed in claim 2 wherein said pressure detector is adapted to detect that said first valve element has moved relative to said second valve element by a predetermined distance or over toward a position where said dynamic pressure chamber communicates with said high pressure source.

4. A brake hydraulic pressure generator as claimed in claim 3 wherein said on-off element is adapted to seal said fluid chamber when said first valve element has moved said predetermined distance or over.

* * * * *